United States Patent [19]

Weaver

[11] Patent Number: 4,529,776
[45] Date of Patent: * Jul. 16, 1985

[54] COMPOSITIONS OF IONIC ELASTOMER AND NYLON

[75] Inventor: Ebon P. Weaver, Naugatuck, Conn.

[73] Assignee: Uniroyal, Inc., Middlebury, Conn.

[*] Notice: The portion of the term of this patent subsequent to May 15, 2001 has been disclaimed.

[21] Appl. No.: 606,026

[22] Filed: May 2, 1984

Related U.S. Application Data

[63] Continuation-in-part of Ser. No. 345,270, Feb. 2, 1975, Pat. No. 4,448,934.

[51] Int. Cl.$^3$ .......................... C08F 27/06; C08L 23/32
[52] U.S. Cl. ...................................... 525/184; 524/399
[58] Field of Search .......................................... 525/184

[56] References Cited

U.S. PATENT DOCUMENTS 4,448,934 5/1984 Weaver .............................. 525/184

Primary Examiner—Lewis T. Jacobs
Assistant Examiner—A. L. Carrillo
Attorney, Agent, or Firm—John A. Shedden

[57] ABSTRACT

A composition comprising an admixture of nylon and an elastomer containing neutralized sulfonated ethylene propylene diene rubbers (EPDM) and a preferential plasticizer is disclosed. The composition preferably comprises from 10 to 25 wt. % of the elastomer and forms compositions having high impact resistance.

6 Claims, No Drawings

COMPOSITIONS OF IONIC ELASTOMER AND NYLON

CROSS-REFERENCES TO RELATED APPLICATION

This is a continuation-in-part of U.S. patent application, Ser. No. 345,270, filed Feb. 2, 1982 now U.S. Pat. No. 4,448,934, issued May 15, 1984.

BACKGROUND OF THE INVENTION

It has long been desired to improve nylon's impact resistance. It has been proposed that nylon be modified to form a toughened, multi-phase, thermoplastic composition in U.S. Pat. No. 4,174,358. In such patent, the major phase is a polyamide resin, the other phases being an added polymer of proper particle size and suitable modulus which is adhered to the polyamide matrix resin. A variety of such added polymers are listed on column 6 of the aforesaid patent. However, according to the teaching of this patent, at 20% carbonate modified EPDM concentration, 1/3" notched Izod specimens did not exceed 15 ft.-lb./in. of notch according to ASTM D-256-56 when measured at room temperatures. This impact resistance is insufficient for many contemplated applications. Other patents which show the modification of nylon, but which are outside of the scope of the invention, are: U.S. Pat. Nos. 3,465,059; 3,845,163; and 3,388,186.

DESCRIPTION OF THE INVENTION

It has been discovered that nylon and an elastomer containing neutralized sulfonated EPDM and a preferential plasticizer may be admixed in a broad range of weight ratios to form a composition having better impact properties than prior art compositions.

In accordance with the instant invention a polymeric composition is disclosed which includes 10 to 25% ionically crosslinked elastomer containing neutralized sulfonated EPDM, 2 to 6% zinc stearate and 69 to 88% of nylon, all said percentages being by weight, based on the total weight of the composition. More preferably, the elastomer comprises 14 to 22%, the zinc stearate 3.5 to 5.5% and the nylon 72.5 to 82.5%. Most preferably, the elastomer includes 15 to 21% elastomer, 3.5 to 5.5% zinc stearate and 71.5 to 81.5% nylon.

Initially, masterbatches can be made of these materials. The elastomer/nylon ratio should be such that, when the masterbatch is subsequently blended with additional nylon at the processing machine, the total blend has a mix ratio within the above range. Compounding can occur directly from nylon and a dry blend of neutralized sulfonated EPDM and preferential plasticizer or, initially, as indicated above, masterbatches can be made of these material. Examples of shaped articles which may be used with the compositions of the invention are machine covers, transport cases, and wheels. Toughness (impact resistance) is maintained at low temperatures, as are good structural properties such as tensile strength, elongation, and flexural modulus.

The neutralized sulfonated EPDMs which may be used in the practice of the invention are well-known articles of commerce. Their preparation is taught in U.S. Pat. No. 3,642,728, which is incorporated herein by reference. Basically, the olefinic unsaturation sites of an elastomeric polymer are selectively sulfonated to form an acidic sulfonated elastomeric polymer. Sulfonation may be performed by means of complex sulfur-trioxide donor or a Lewis base. The sulfonate groups may be readily neutralized by a basic material at room temperature to form the ionically crosslinked elastomers. The basic material used as a neutralizing agent may be selected from organic amines or basic materials selected from groups 1 through 8 of the Periodic Table or mixtures thereof.

In the presence of preferential plasticizers and under conventional processing conditions (high temperature and high shear force), the ionic association is dissipated, thereby forming a reprocessable elastomer. The preferential plasticizers used in the composition are well known in the art and taught in U.S. Pat. No. 3,847,854, the disclosure of which is incorporated by reference herein. Most preferably, zinc stearate is used as the preferential plasticizer. The term "elastomer" as used herein includes compositions of the neutralized sulfonated EPDM, the preferential plasticizer and other conventional compounding ingredients, such as antioxidants.

With respect to the nylon compositions, these are well known in the art and include semi-crystalline and amorphous resins having molecular weight of at least 5,000. Suitable polyamides include those described in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polycaprolactam (nylon 6), polyhexamethylene adipamide (nylon 66), polyhexamethylene azelaamide (nylon 69), polyhexamethylene sebacamide (nylon 610), and polyhexamethylene dodecanoamide (nylon 612), the polyamide produced by ring opening of lactams, i.e., polycaprolactam, polylauric lactam, poly-ll-aminoundecanoic acid, bis(paraaminocyclohexyl) methane dodecanoamide. It is also possible to use in this invention polyamides prepared by the copolymerization of two of the above polymers or terpolymerization of the above polymers or their components, e.g., an adipic, isophthalic acid hexamethylene diamine copolymer. Preferably the polyamides are linear with a melting point in excess of 200° C. The term "nylon" as used herein refers to nylon containing conventional compounding ingredients as are known to those skilled in the art.

In a preferred embodiment the nylon of the composition of this invention is nylon 6. When nylon 6 is used, the composition preferably includes 13 to 20% ionic elastomer, 3 to 5% zinc stearate and 75 to 84% nylon 6.

In another preferred embodiment the polymeric composition employs nylon 66 as the nylon constituent. In that preferred embodiment, the composition preferably comprises 16 to 22% ionic elastomer, 4 to 6% zinc stearate and 72 to 82% nylon 66.

In still another preferred embodiment a combination of nylon 6 and nylon 66 is utilized. In this composition, preferably, 16 to 20% ionic elastomer, 4 to 5.5% zinc stearate and 74.5 to 80% of a combination of nylon 6 and nylon 66 is admixed.

It is emphasized that the preferred embodiments discussed above are all admixtures of the components mentioned and that percentages are by weight, based on the total weight of the composition.

A Banbury mixer may be conveniently used for forming the blends of the invention. On the other hand, in the case of compositions with high nylon concentrations, an extruder is preferable. The product from the Banbury or the extruder, as the case may be, is chilled, cut into pellets and, after drying, molded. It should be understood that other blending techniques may be used. It is important that the mixer can be operated at a temperature of from 10° to 40° F. hotter than the melting point of the nylon. Such mixers may be screw-injection molding machines, compounding extruders, plastics extruders, or other shear mixers known to those skilled in the art. Dispersion and compatibility are necessary to obtain maximum impact of the finished product. Some improvement can be obtained even in low shear mixing, but this is not preferred. To obtain the best quality compositions, both the nylon and the elastomer should be dried before compounding or processing. Additionally, where a high melting nylon is used, a nitrogen blanket is helpful to preserve color and retard degradation.

To more clearly illustrate the invention, attention is directed to the following examples:

EXAMPLE 1

One hundred parts of a neutralized sulfonated EPDM (Uniroyal's Ionic Elastomer 2590) is compounded with 8 parts of zinc stearate and 0.5 part of tetrakis methylene (3,5-di-tert-butyl-4-hydroxhydro-cinnamate)methane, an antioxidant. This elastomer is blended to form two masterbatches. The first, hereinafter Masterbatch B, is composed of 60 parts of the elastomer and 40 parts of nylon 11 (BESNO 40 PTL nylon, a trademark of Rilsan Corporation). The second masterbatch, hereinafter Masterbatch A, is formed from 40 parts of the aforesaid elastomer and 60 parts of the nylon 11.

To prepare the masterbatch, the ingredients are added to a Banbury heated to 250° F. and mixed at high speed until mixing is complete. The batch is then passed through a 330° mill set at $\frac{1}{4}''$. The blended composition is cut and ground. Thereafter, Masterbatches A and B, respectively, are mixed with varying quantities of pellets of nylon 6 in the throat of a screw-fed injection molding machine. The machine barrel temperature is set at about the melt temperature of the nylon, so that the temperature of the melt on injection is 10° to 40° F. hotter than the melting temperature of the nylon. Complete dispersion is achieved in the screw of the molding machine.

Table 1 shows the notched impact resistance (ft.-lb./in. notch) at room temperature and at -40° F. of $\frac{1}{8}''$ strips of nylon 6 and various blends of the invention made from Masterbatches A and B.

TABLE 1

|  | Nylon 6 | Masterbatch A | | Masterbatch B | |
|---|---|---|---|---|---|
| % Elastomer in Final Mix | 0 | 5 | 10 | 15 | 5 | 10 |
| $\frac{1}{8}''$ Notched Izod at room temperature | 0.4 | 0.8 | 1.3 | 1.4 | 1.0 | 1.4 |
| $\frac{1}{8}''$ Notched Izod at −40° F. | 0.4 | 0.5 | 0.6 | 0.6 | 0.7 | 0.7 |

The above table shows a marked increase in impact resistance of the compositions of the invention in comparison to the prior art. In the samples where the final composition contained 10 and 15 parts per hundred of the elastomer, the increase of impact resistance at room temperature is in excess of three-fold. It should also be noted that the blends formed from Masterbatch B, at comparable elastomer contents, are consistently better than those obtained from Masterbatch A.

EXAMPLE 2

This example shows the effect of using the same type of nylon in forming the masterbatch as is added to form the final blend (a compatible system). Using the same procedures as shown in Example 1, the following results are obtained:

TABLE 2

|  | Nylon 11 | Masterbatch A | | Masterbatch B | |
|---|---|---|---|---|---|
| % Elastomer in Final Mix | 0 | 8.3 | 19.6 | 38.4 | 29.3 | 57.1 |
| $\frac{1}{8}''$ Notched Izod at room temperature | 1.16 | 16.7 | 18.2 | NB | 15.9 | NB |
| $\frac{1}{8}''$ Notched Izod at −40° F. | 0.3 | 2.4 | 2.8 | 13.4 | 20 | NB |

NB = No Break. The impacting weight deformed the sample without breaking it.

The above data clearly show that exceptional improvement is obtained when combining compatible matrix polymers.

EXAMPLE 3

A series of compositions were prepared in accordance with the procedure of Example 1 in which neutralized sulfonated EPDM (Uniroyal Ionic Elastomer 2590) was admixed with nylon 11. Compositions were prepared in which the ionic elastomer (neutralized sulfonated EPDM) ranged in a concentration of from 0 to 57% by weight, based on the total weight of the composition. The compositions were injected molded into $\frac{1}{8}''$ strips which were tested for notched Izod in accordance with the procedure set forth in ASTM D-256A. The results of this test, conducted at room temperature, are summarized in Table 3.

TABLE 3

| Impact Resistance of Nylon 11 Blends As a Function of Ionic Elastomer Concentration | |
|---|---|
| Wt % Ionic Elastomer in Composition | Notched Izod, ft lb/ at Room Temp |
| 0 | 14.25 |
| 8.3 | 16.75 |
| 13.0 | 18.3 |
| 14.3 | 17.9 |
| 19.5 | 18.75 |
| 26.0 | 17.50 |
| 29.0 | 16.00 |
| 38.5 | 11.20 |
| 57.0 | 4.75 |

The data in Table 3 establishes that impact strength is maximized at about 20% by weight ionic elastomer. Above 20% the impact strength (or resistance) decreases.

EXAMPLE 4

A series of compositions comprising neutralized sulfonated EPDM, the preferential plasticizer, zinc stearate, an antioxidant (Irganox [trademark] 1010) and nylon (Allied Capron [trademark] 8202) were prepared. This preparation involved tumble blending the ionic elastomer crumb with the zinc stearate and Irganox 1010 powders so that the powders were well dispersed in the elastomer. This blend was metered at the rear of a 53 mm ZSK [trademark] compounding extruder and fluxed in the barrel. The rearward barrel zones were set at 325° F. Nylon to be blended with the fluxed ionic elastomer-zinc stearate-antioxidant was metered downstream in appropriate ratios at barrel middle zones temperature of 540° F. to insure melting of the nylon. The temperature 540° F. was selected since the nylon blended was nylon 6. This temperature is consistent with proper melting and mixing of nylon 6. Partial mixing of the nylon 6 into the elastomer was obtained in these zones. Final mixing of the nylon and elastomer occurred in the last zones, maintained at a temperature of 490° F. Following mixing, the molten blend was extruded through a multi-strand die quenched continuously in a water bath and chopped into pellets for injection molding.

The compositions thus formed into pellets and injected molded into test bars and measured for impact strength by the notched Izod test conducted in accordance with the procedure enumerated in ASTM D256A, at room temperature. The results of these tests are tabulated in Table 4.

TABLE 4

| Composition, %, by Wt | | | | |
|---|---|---|---|---|
| Ionic Elastomer | Zinc Stearate | Irganox 1010 | Nylon 6 | ⅛″ Notched Izod, ft lb/in |
| 19.0 | 4.8 | 0.2 | 76.0 | 21.0 |
| 17.3 | 4.3 | 0.2 | 78.2 | 21.5 |
| 15.5 | 3.9 | 0.2 | 80.4 | 22 |
| 13.6 | 3.6 | 0.2 | 82.6 | 21.4 |
| 11.7 | 2.9 | 0.1 | 85.3 | 5.5 |

EXAMPLE 5

Compositions comprising mixtures of the same ionic elastomer, preferential plasticizer and antioxidant used in Example 4 with nylon 66 were prepared. The procedure for their preparation was exactly the same as in Example 4 except that nylon 66 (DuPont Zytel [trademark] 42) replaced the nylon 6 of that example. Temperatures in the ZSK extruder were slightly adjusted to account for the difference in melting temperature of nylon 66 compared to nylon 6.

The compositions formed were molded in ⅛″ strips and tested in accordance with the procedure of Example 4. The results of this test appear in Table 5.

TABLE 5

| Composition, %, by Wt | | | | Notched Izod, ft lb/ in (at Room Temp) |
|---|---|---|---|---|
| Ionic Elastomer | Zinc Stearate | Irganox 1010 | Nylon 66 | |
| 19.9 | 5.0 | 0.1 | 75.0 | 19.1 |
| 17.5 | 4.4 | 0.1 | 78.0 | 16.5 |
| 15.1 | 3.8 | 0.1 | 81.0 | 5.0 |
| 13.9 | 3.5 | 0.1 | 82.5 | 4.0 |
| 12.7 | 3.2 | 0.1 | 84.0 | 5.9 |

EXAMPLE 6

The tests of Examples 4 and 5 were repeated except that the nylon employed was a combination of nylon 6 and nylon 66 (Monsanto Vydene [trademark] 86X).

The results obtained for impact strength testing of compositions made using Vydene 86X appear in Table 6.

TABLE 6

| Composition, %, by Wt | | | | Notched Izod, ft lb/ in (at Room Temp) |
|---|---|---|---|---|
| Ionic Elastomer | Zinc Stearate | Irganox 1010 | Nylon 6/ Nylon 66 | |
| 19.1 | 4.8 | 0.1 | 76.0 | 17.5 |
| 17.3 | 4.3 | 0.1 | 78.3 | 18.6 |
| 15.5 | 3.9 | 0.1 | 80.5 | 4.4 |
| 13.6 | 3.4 | 0.1 | 82.9 | 4.7 |
| 11.7 | 2.9 | 0.1 | 85.3 | 2.8 |

The above examples and embodiments will make apparent, to those skilled in the art, other examples and embodiments. These other examples and embodiments are within the contemplation of the instant invention. Therefore, the scope of the instant invention should be limited only by the appended claims.

What is claimed is:

1. A polymeric composition which comprises an admixture of:
   10 to 25% of an ionically crosslinked elastomer containing neutralized sulfonated EPDM;
   2 to 6% of zinc stearate; and
   69 to 88% of a nylon selected from the group consisting of nylon 6, nylon 66, nylon 69, nylon 610, nylon 612 and mixtures thereof;
   all said percentages being by weight based on the total weight of said composition.

2. A composition in accordance with claim 1 wherein said composition comprises 14 to 22% of said elastomer, 3.5 to 5.5% of said zinc stearate and 72.5 to 82.5% of said nylon.

3. A composition in accordance with claim 2 wherein said composition comprises 15 to 21% of said elastomer, 3.5 to 5.5% of said zinc stearate and 71.5 to 81.5% of said nylon.

4. A polymeric composition which comprises an admixture of 13 to 20% of an ionically crosslinked elastomer containing neutralized sulfonated EPDM; 3 to 5% of zinc stearate; and 75 to 84% of nylon 6; all said percentages being by weight based on the total weight of said composition.

5. A polymeric composition which comprises an admixture of 16 to 22% of an ionically crosslinked elastomer containing neutralized sulfonated EPDM; 4 to 6% of zinc stearate; and 72 to 80% of nylon 66, all said percentages being by weight, based on the total weight of said composition.

6. A polymeric composition which comprises an admixture of 16 to 20% of an ionically crosslinked elastomer containing neutralized sulfonated EPDM; 4 to 5.5% of zinc stearate; and 74.5 to 80% of a combination of nylon 6 and nylon 66, all said percentages being by weight, based on the total weight of said composition.

* * * * *